United States Patent [19]
Schmittle

[11] Patent Number: 5,765,777
[45] Date of Patent: Jun. 16, 1998

[54] STOL/VTOL FREE WING AIRCRAFT WITH VARIABLE PITCH PROPULSION MEANS

[75] Inventor: Hugh Schmittle, Westminster, Md.

[73] Assignee: Freewing Aerial Robotics Corporation, College Park, Md.

[21] Appl. No.: 468,397

[22] Filed: Jun. 6, 1995

Related U.S. Application Data

[63] Continuation-in-part of Ser. No. 332,321, Oct. 31, 1994, abandoned, which is a continuation of Ser. No. 7,130, Jan. 22, 1993, Pat. No. 5,395,073, which is a continuation-in-part of Ser. No. 850,913, Mar. 13, 1992, Pat. No. 5,340,057, which is a continuation-in-part of Ser. No. 795,329, Nov. 21, 1991, Pat. No. 5,280,863.

[51] Int. Cl.$^6$ ............... B64C 3/42; B64C 27/28; B64C 27/52
[52] U.S. Cl. ............... 244/48; 244/7 C; 244/17.25; 244/181; 244/182
[58] Field of Search ............... 244/7, 7 B, 7 C, 244/12.4, 17.25, 181, 182, 51, 52, 48

[56] References Cited

U.S. PATENT DOCUMENTS

| | | | |
|---|---|---|---|
| Re. 18,181 | 9/1931 | Stelzer | 244/38 |
| 1,016,929 | 2/1912 | Black | 244/38 |
| 1,083,464 | 1/1914 | Roche | 244/82 |
| 1,132,503 | 3/1915 | Wittkowski | 244/80 |
| 1,472,103 | 10/1923 | Vandevelde | 244/48 |
| 1,771,257 | 7/1930 | Ingram | 244/48 |
| 1,772,586 | 8/1930 | Wilford | 244/37 |
| 1,845,307 | 1/1932 | Maxwell | 244/7 C |
| 1,861,336 | 5/1932 | Cox | 244/7 C |
| 1,906,005 | 4/1933 | Hall | 244/48 |
| 2,058,678 | 10/1936 | Fry | 244/7 B |
| 2,063,030 | 12/1936 | Crouch | 244/7 C |
| 2,066,649 | 1/1937 | Sabins | 244/38 |
| 2,082,674 | 6/1937 | Young | 244/82 |
| 2,118,987 | 5/1938 | Smith | 244/48 |
| 2,300,268 | 10/1942 | Stuart, 3D | 244/7 B |
| 2,347,230 | 4/1944 | Zuck | 244/82 |
| 2,362,224 | 11/1944 | Roseland | 244/48 |
| 2,382,460 | 8/1945 | Young | 244/7 B |
| 2,387,762 | 10/1945 | Leonard | 244/7 B |
| 2,416,958 | 3/1947 | Sears | 244/13 |
| 2,438,309 | 3/1948 | Zimmerman | 244/13 |
| 2,481,379 | 9/1949 | Zimmerman | 244/7 B |
| 2,541,922 | 2/1951 | Hosford | 244/82 |
| 2,580,312 | 12/1951 | Moore | 244/7 C |
| 2,584,667 | 2/1952 | Bockrath | 244/38 |
| 2,622,826 | 12/1952 | Prince | 244/7 B |
| 2,623,712 | 12/1952 | Spratt | 244/48 |
| 2,708,081 | 5/1955 | Dobson | 244/7 C |
| 2,959,373 | 11/1960 | Zuck | 244/7 |
| 2,960,285 | 11/1960 | Lopez | 244/82 |
| 3,006,582 | 10/1961 | Geiger | 244/82 |
| 3,035,789 | 5/1962 | Young | 244/7 |
| 3,166,271 | 1/1965 | Zuck | 244/7 |
| 3,236,182 | 2/1966 | Dahm | 102/50 |
| 3,415,469 | 12/1968 | Spratt | 244/48 |
| 3,430,894 | 3/1969 | Strand et al. | 244/7 |
| 3,477,664 | 11/1969 | Jones | 244/48 |
| 3,561,702 | 2/1971 | Jones | 244/16 |
| 3,586,268 | 6/1971 | Melvin | 244/77 |
| 3,587,770 | 6/1971 | Flower | |
| 3,714,825 | 2/1973 | Melvin | 73/178 T |
| 3,730,459 | 5/1973 | Zuck | 244/48 |
| 3,795,373 | 3/1974 | Gerard | 244/48 |
| 4,124,180 | 11/1978 | Wolowicz | 244/82 |
| 4,415,132 | 11/1983 | Shirk | 244/45 |
| 4,568,043 | 2/1986 | Schmittle | 244/48 |
| 4,596,368 | 6/1986 | Schmittle | 244/48 |
| 4,730,795 | 3/1988 | David | 244/7 R |
| 4,928,907 | 5/1990 | Zuck | 244/48 |
| 4,967,984 | 11/1990 | Allen | 244/35 |
| 5,086,993 | 2/1992 | Wainfan | 244/48 |
| 5,098,034 | 3/1992 | Lendriet | 244/39 |
| 5,280,863 | 1/1994 | Schmittle | 244/48 |
| 5,289,994 | 3/1994 | Del Campo Aguilera | 244/7 B |
| 5,340,057 | 8/1994 | Schmittle | 244/48 |

*Primary Examiner*—Virna Lissi Mojica
*Attorney, Agent, or Firm*—Lowe Hauptman Gopstein & Berner

[57] ABSTRACT

A VTOL/STOL free wing aircraft includes a free wing having wings on opposite sides of a fuselage connected to one another respectively for free rotation about a spanwise access. Improved control upon landing of the aircraft is achieved by utilizing a variable pitch propulsion system, enabling the pitch of the propeller to be varied corresponding to the speed of the aircraft and angle of approach upon descent.

2 Claims, 3 Drawing Sheets

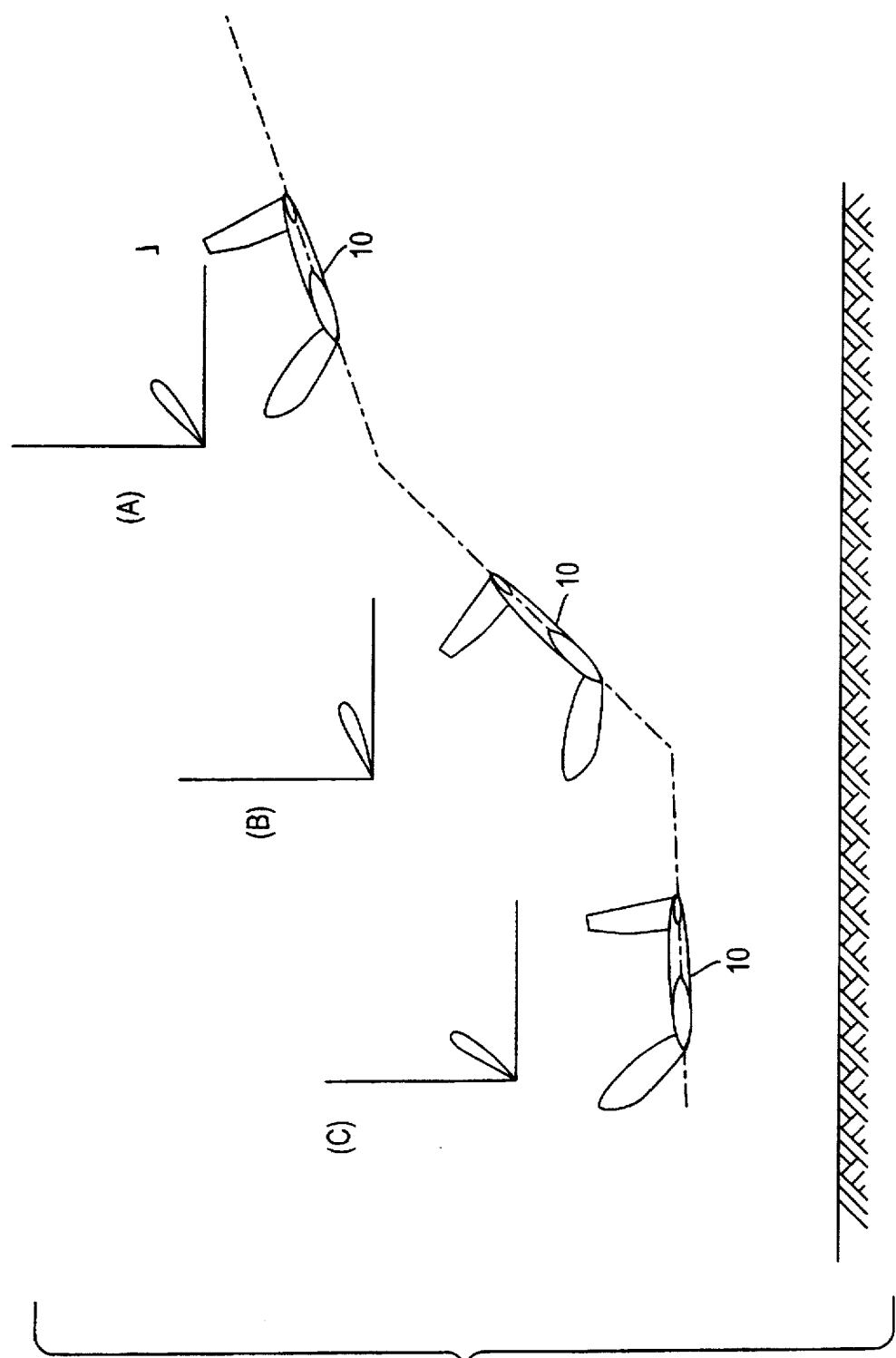

1

STOL/VTOL FREE WING AIRCRAFT WITH VARIABLE PITCH PROPULSION MEANS

RELATED APPLICATIONS

The present application is a continuation-in-part of co-pending prior application Ser. No. 08/332,321, filed Oct. 31, 1994, now abandoned, which is a continuation of prior application Ser. No. 08/007,130, filed Jan. 22, 1993, entitled "STOL/VTOL Free Wing Aircraft With Articulated Tail Boom," now U.S. Pat. No. 5,395,073, which is a continuation-in-part of prior application Ser. No. 07/850,913, filed Mar. 13, 1992, entitled "Thrust Vectoring Free Wing Aircraft," now U.S. Pat. No. 5,340,057, which is a continuation-in-part of prior application Ser. No. 07/795,329, filed Nov. 21, 1991, entitled "Lockable Free Wing Aircraft," now U.S. Pat. No. 5,280,863, the disclosures of which are incorporated by reference herein in their entirety.

TECHNICAL FIELD

The present invention relates generally to short field and vertical take-off and landing (STOL/VTOL) aircraft and, more particularly, to a STOL/VTOL freewing aircraft including thrust vectoring means located either inside or outside of the propeller wash, the thrust vectoring means permitting transitioning between STOL or VTOL and straight and level flight.

BACKGROUND ART

The above-referenced parent applications disclose aircraft utilizing a free wing configuration. As used in this present specification, a free wing or "freewing" is a wing attached to an aircraft fuselage in a manner such that the wing is freely pivotable about its spanwise axis. This arrangement enables the wing to have an angle of attack which is determined solely by aerodynamic forces acting on the wing. Rotation of the wing, without pilot intervention, induced by changes in the direction of relative wind over the wing surfaces, causes the angle of incidence between the wing and the aircraft fuselage to vary so that the wing presents a substantially constant angle of attack to the relative wind which, in horizontal flight, enables the aircraft to be essentially stall free.

The free wing is free to rotate or pivot about its spanwise axis, preferably located forward of its aerodynamic center. The free wing generally includes left and right wings extending from opposite sides of the fuselage; these wings are coupled together to collectively freely pivot about the spanwise axis. The left and right wings may be adjustable in pitch relative to one another as disclosed in the aforesaid applications, the relevant disclosures of which are incorporated by reference herein. The aircraft may further include rudders and elevators in the tail section which may be controlled in a conventional manner for yaw and pitch control, respectively. As used in this present specification, the term "common propulsion system" means the same propulsion system for supplying the necessary thrust for both horizontal and vertical flight operations and is not necessarily limited to a single thrust producing system, such as a single propeller, but could include multiple thrust producing systems such as a pair of engines driving separate propellers, provided that the multiple thrust producing systems are used for supplying thrust in both vertical and horizontal flight modes.

The above-referenced U.S. Pat. Nos. 5,340,057 and 5,395,073 disclose different embodiments of a thrust vectoring VTOL/STOL aircraft having a free wing. The first-mentioned patent, '057, discloses a VTOL aircraft generally including a fuselage, a free wing, a propulsion system, and aerodynamic surfaces carried by the fuselage for vectoring the thrust of the propulsion system away from the predetermined direction of flight sufficiently to achieve near vertical flight orientation to establish an angle between the fuselage and the direction of flight. That is, the fuselage is "tilted" relative to the direction of flight. When the fuselage is so tilted, the direction of thrust becomes vectored, that is, the direction is neither vertical nor horizontal, but includes components in both directions. In the embodiment of the '057 patent, the thrust vectoring means is located entirely within the propeller wash. In the second embodiment disclosed in the "073 patent, the thrust vectoring means is not entirely within the propeller wash. Specifically, this embodiment includes a tail section having a horizontal surface which protrudes from the tail section to such an extent that it is not affected by, i.e., is outside of, the propeller wash.

The operation of both embodiments is similar. Upon take-off, the fuselage of the aircraft is oriented either vertical, in a VTOL aircraft, or near vertical, in a STOL aircraft, so that the thrust vector is entirely or primarily vertical. To transition from vertical to horizontal flight, the pitch of the fuselage is caused to move toward a horizontal orientation. By pitching the fuselage, the thrust vector also inclines from the vertical and thus has a horizontal thrust component. As the fuselage pitches toward the horizontal, the horizontal speed of the aircraft increases, causing the freely rotatable wing to rotate relative to the fuselage in accordance with the relative wind. The effects of the relative wind acting on the freely rotating wings quickly overcome the effects of the airflow over the wings from the propulsion system and, with increasing horizontal speed, the wing develops lift. The aircraft soon transitions into horizontal flight in a free wing flight mode.

To transition from horizontal to vertical flight, the reverse procedure is employed. That is, an up elevator command is given to rotate the fuselage toward a vertical orientation with its nose pointed upwardly. Horizontal speed is thus decreased and a vertical thrust vector is introduced. Accordingly, the relative wind changes and the free wing and fuselage ultimately both rotate into a vertical or near vertical orientation.

In a freewing as disclosed herein, lift is generated with the wings and the propeller. Fixed wing aircraft use the wing for their main lift control, in other words, the angle of attack of the wing is manipulated, i.e., by elevating the tail, to vary the lift of the aircraft. In the freewing aircraft, manipulation of the angle of attack is accomplished by varying both the trailing edge of the wing and the output of the engine. With increasing horizontal airspeeds, the majority of the lift is accomplished by the wings. As the horizontal airspeed is reduced, i.e., as the aircraft is landing, the lift generated by the propeller increases, compensating for the decreasing wing lift.

With the tilt body comes the ability to manipulate the direction of thrust, i.e., vectoring the thrust. When the thrust is vectored away from horizontal, lift is generated by the propeller. Thus, as opposed to fixed wing aircraft, the glide path, i.e., the path of the aircraft in approaching the runway, may be manipulated primarily by varying the direction and/or magnitude of thrust. In a fixed-pitch propeller system, the only means of controlling the engine is via the throttle. By increasing the throttle, more thrust and consequently more lift is generated, with a shallower glide approach resulting, and by decreasing the throttle, the thrust and the lift are decreased, and a steeper approach results.

One problem associated with using only the throttle for flight control in landing is spool-up delay. When a pilot realizes that the descent of the aircraft is too steep, the throttle is increased to shallow out the approach glide angle. When the throttle is so increased, there is a delay before the engine reaches the setting of the throttle, that is, there is a delay in the spool up of the engine. Furthermore, there is a delay in feedback to the pilot of the engine's response to the throttle command. Once the engine responds to the throttle command, the pilot does not instantaneously recognize the response until the rev of the engine is heard. The pilot often overcompensates for the lack or delay in response of the engine either by further increasing the throttle or by not letting up on the throttle, resulting in a glide path that is too shallow. Thus, it is very difficult to land using the throttle as the only control.

Accordingly, it is an object of the present invention to provide an improved propulsion means for a thrust vectoring free wing aircraft.

It is another object of this invention to provide an improved propulsion means for a thrust vectoring free wing aircraft that permits better glide path control on landing.

It is yet another object of this invention to provide an improved propulsion means for a thrust vectoring free wing aircraft that eliminates the aforementioned spool-up delay.

It is a further object of this invention to provide an improved propulsion means for a thrust vectoring free wing aircraft that provides better and more instantaneous feedback to the pilot of the aircraft.

It is yet another object of this invention to provide an improved propulsion means for a thrust vectoring free wing aircraft that permits a wider range of airspeeds.

SUMMARY OF THE INVENTION

These and other objects are achieved by the provision of a variable pitch propulsion system.

A thrust vectoring free wing aircraft, according to the present invention, comprises a fuselage including a source of propulsion for propelling the aircraft in a horizontal flight and in a short field take-off and landing (STOL) flight mode, the source of propulsion including a variable pitch propulsion system. A free wing is connected to the fuselage for free pivotal movement relative thereto about a spanwise axis. A tail boom is connected to the fuselage, the tail boom being formed with horizontal tail surfaces and vertical tail surfaces to provide for directional stability and yaw control. Also provided is a mechanism pivoting the fuselage relative to the tail boom independently from pivoting of the freewing about the spanwise axis, about an axis of pivot extending parallel to or coincident with the spanwise axis.

In accordance with another embodiment of the present invention, an aircraft is provided comprising a fuselage and a wing having an aerodynamic center and connected to the fuselage for free pivotal movement about a spanwise axis for flight in a predetermined generally horizontal direction in a free wing mode of aircraft operation. A propulsion system is carried by the fuselage for developing thrust and propelling the aircraft. The propulsion system includes at least one variable pitch propeller for propelling the aircraft both in the predetermined direction and in a near vertical flight orientation. Aerodynamic surfaces are carried by the fuselage for vectoring the thrust of the propulsion system away from the predetermined direction of flight sufficiently to achieve the near vertical flight orientation. An angle is thus established between the fuselage and the direction of flight.

This invention also contemplates a method of propelling an aircraft in generally vertical and horizontal flight modes. The method comprises the steps of propelling the aircraft via a variable pitch propulsion system in one of the flight modes with a pair of wings being freely rotatable relative to a fuselage in accordance with aerodynamic forces acting on the wings and the fuselage, and relatively pivoting the fuselage so that (1) a longitudinal axis thereof is in substantial alignment with tail surfaces projecting rearwardly from the fuselage in a straight and level or horizontal flight mode or (2) the fuselage and longitudinal axis thereof is oriented generally vertically and substantially perpendicular to the tail surfaces in a vertical flight mode.

In accordance with yet another aspect of this invention, a method for adjusting the glide path control of a VTOL/STOL aircraft propelled by a variable pitch propulsion system during landing, comprises the steps of determining whether the speed of the aircraft on descent is too rapid or too slow, and adjusting the pitch of the propeller blades to adjust the speed of the aircraft.

The step of adjusting the pitch of the propeller blades preferably comprises increasing the pitch of the propeller blades to decrease the speed of the aircraft, and decreasing the pitch of propeller blades to increase the speed of the aircraft.

In accordance with a further aspect of this invention, a method for adjusting the glide path control of a VTOL/STOL aircraft propelled by a variable pitch propulsion system during landing, comprises the steps of determining whether the angle descent of the aircraft is too steep or too shallow; and adjusting the pitch of the propeller blades to adjust the angle of descent of the aircraft.

Again, the step of adjusting the pitch of the propeller blades preferably comprises increasing the pitch of the propeller blades to decrease the angle of descent of the aircraft; and decreasing the pitch of propeller blades to increase the angle of descent of the aircraft.

BRIEF DESCRIPTION OF THE DRAWINGS

FIG. 3 is a schematic representation of the effect that varying the pitch of the propeller blades has on the glide path of the aircraft.

DETAILED DESCRIPTION OF THE PREFERRED EMBODIMENTS

Figure 1:
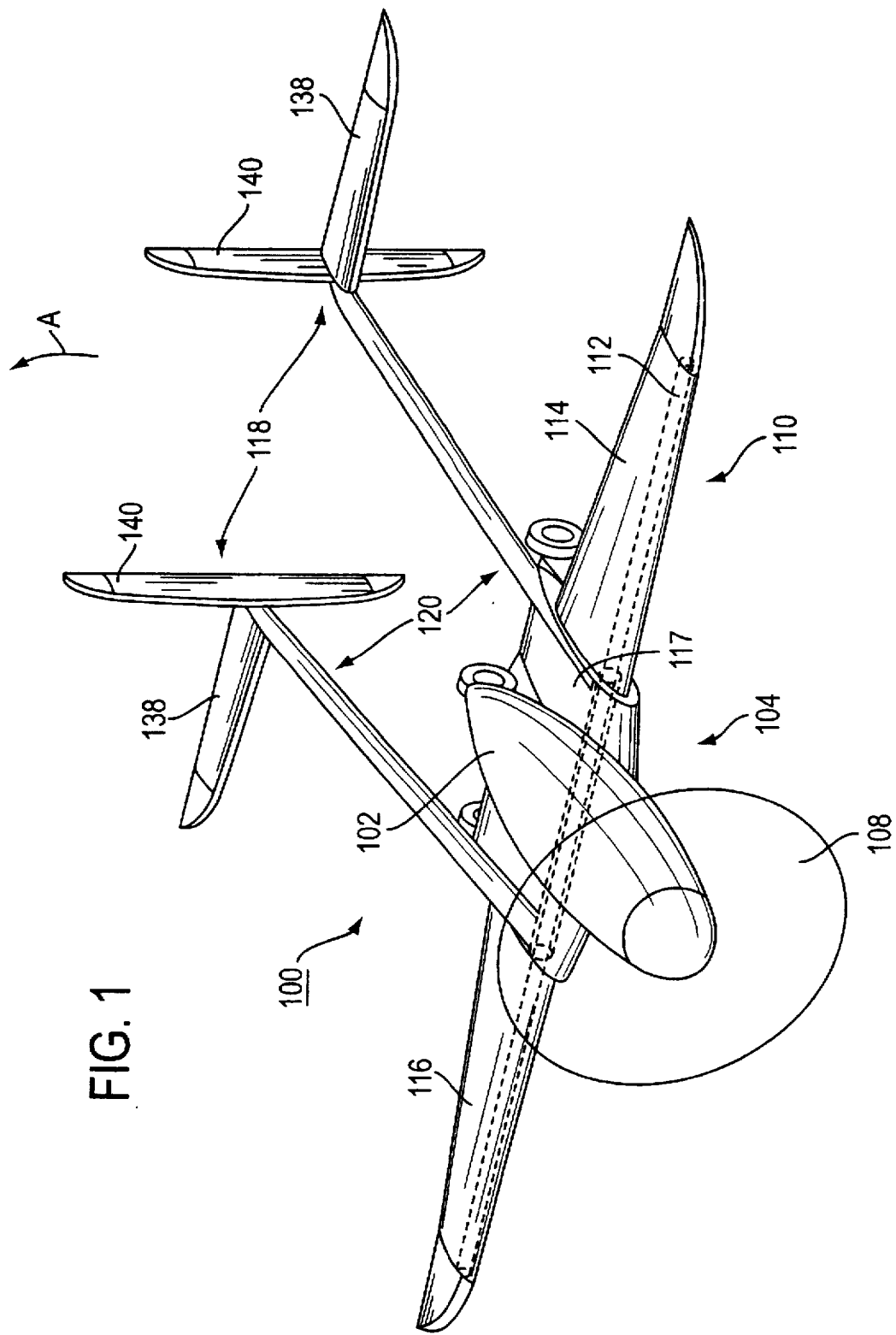
FIG. 1 is a perspective view of an embodiment of the VTOL/STOL free wing aircraft according to the present invention, depicted in the straight and level flight mode.
Figure 2:
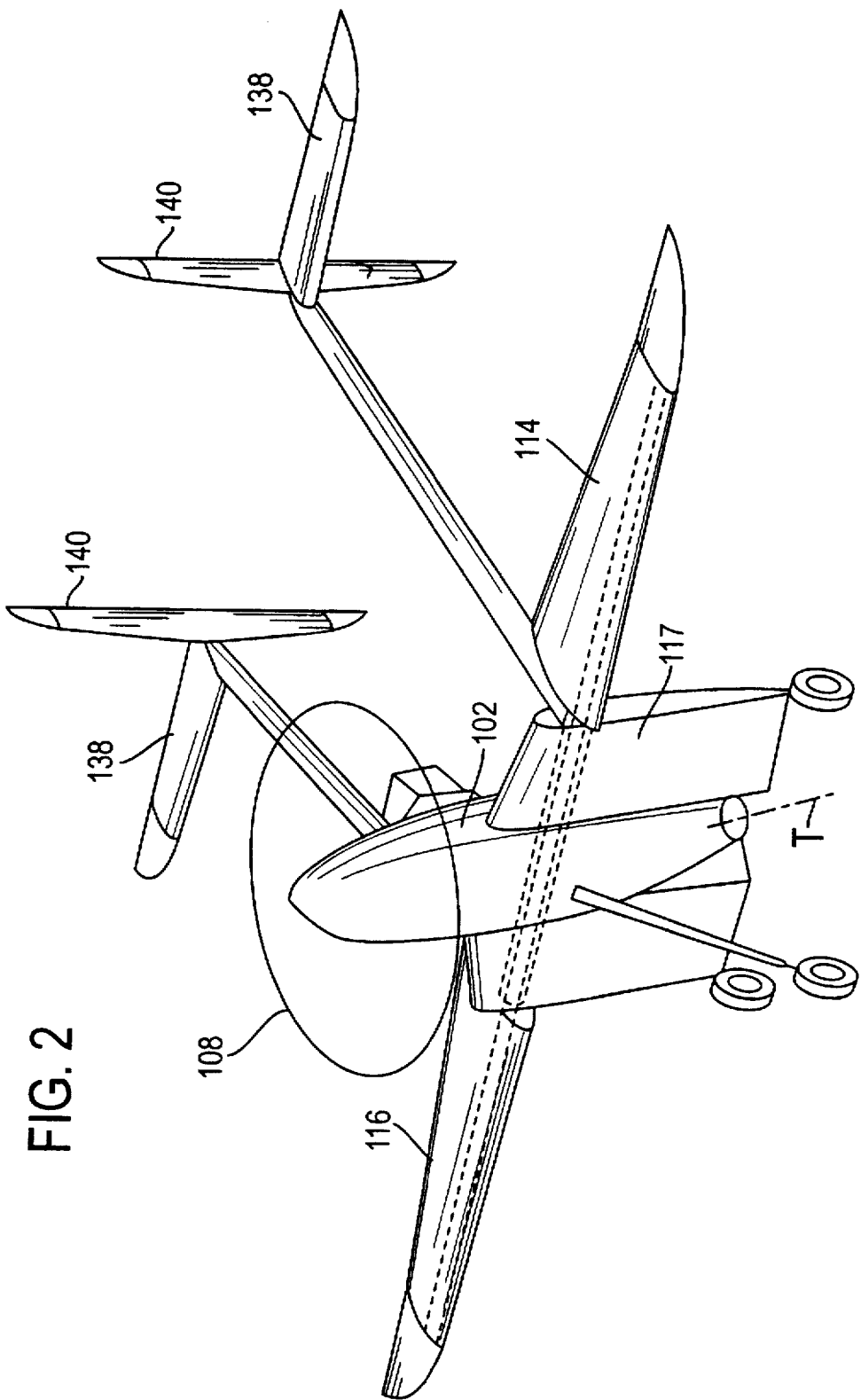
FIG. 2 is a perspective view of the aircraft of FIG. 1, wherein the fuselage is in the tilted up or VTOL/STOL orientation.

Referring to FIGS. 1 and 2, there is depicted an a VTOL/STOL free wing aircraft 100, as disclosed in co-pending application Ser. No. 08/007,130, now U.S. Pat. No. 5,395,073, incorporated herein by reference, capable of short field take-offs and landings (STOL) and straight and level flight, and, with some minor modifications, vertical take-offs and landings (VTOL) as well. Although the features of this invention is described with reference to the embodiment shown in FIGS. 1 and 2 and disclosed in the '073 patent, it is to be appreciated that the invention is equally applicable to the VTOL embodiment disclosed in the '057 patent.

The free wing aircraft 100 comprises a fuselage 102 containing a variable pitch propulsion system 104 including an engine mounted to the fuselage rotating a variable pitch propeller 108. A free wing 110 is connected to the fuselage 102 and is free to rotate or pivot about its spanwise axis 112 located forward of its aerodynamic center. The free wing 110 includes left and right wings 114 and 116 extending from a fixed wing root or center section 117 formed on opposite sides of the fuselage 102 and which left and right wings are coupled together as disclosed in the '073 patent, to collectively freely pivot about the spanwise axis 112. The left and right wings 114, 116 may be adjustable in pitch relative to one another in the manner described in the aforesaid '057 patent, or may be formed with elevons (not shown) to provide for elevator and aileron control. The aircraft 100 further comprises a tail section 118 which is mounted to a boom assembly 120 pivotally connected or articulated to the fuselage 102 for movement relative to the fuselage both into and out of alignment with the thrust line T of the propulsion system 104 to enable STOL/VTOL operations as well as straight and level flight. Preferably, boom assembly 120 includes a pair of parallel booms 134, each including at the rear end thereof a horizontal stabilizing member 138 and a vertical stabilizing member 140.

The feature of swinging or pivoting the entire boom assembly 120 and tail section 118 out of straight and level alignment with the fuselage 102 and the thrust line T of propulsion system 104 thereon advantageously results in an aircraft 100 capable of taking off and landing in slow flight or STOL mode while retaining the advantages of free wing flight.

Since the tail surfaces 138, 140 are not subject to any dynamic pressure effects caused by the slip stream of propeller 108 when in the STOL flight mode of FIG. 2, it will be appreciated that directional stability and yaw control deteriorates at extremely slow or 0 horizontal speeds as will occur during VTOL flight as opposed to STOL flight. The fixed wing center section 117 advantageously remain in the slip stream and the dynamic pressure acting thereon tends to provide some degree of directional stability and yaw control. Further stability and control may be achieved with additional fins (not shown) which may project outwardly from fuselage 102 or fixed wing center section 117 to provide additional surfaces for improved stability and control. As will now occur to one of ordinary skill, such fins may either continuously project from the fuselage or fixed wing section, or may be retractably mounted therein to project from the fuselage and become operational only during VTOL flight.

The fixed wing root or center section 117 in horizontal flight mode depicted in FIG. 2, performs as a wing by generating lift in association with the left and right free wing sections 114, 116. When the tail boom 120 is "raised," the fixed wing center section 117 advantageously act as an aerodynamic brake (see, e.g., the FIG. 2 position) to rapidly decelerate the aircraft 100 to slow flight.

The operation of the STOL free wing aircraft 100 of this invention will now be described.

At takeoff, aircraft 100 is initially lifted by the variable pitch propulsion system 104 from the landing field or platform. To transition from vertical or near vertical (take-off or flight) to horizontal flight, the pilot or remote controller rotates the boom from its position depicted in FIG. 2 to that depicted in FIG. 1. As the boom 120 is "lowered" in the direction opposite arrow A, the fuselage 102 pitches toward the horizontal which in turn causes the horizontal speed of the aircraft to increase. This in turn causes the freely rotatable wing 110 to rotate relative to the fuselage 102 in accordance with the relative wind. The effects of the relative wind acting on the freely rotating wing 110 quickly overcome the braking effects of the air flow over the fixed wing center section 117 from the variable pitch propulsion system 104 and, with increasing horizontal speed, the wing 110 develops lift. The aircraft 100 soon transitions into horizontal flight in a free wing straight and level flight mode.

Assuming the pilot or remote control aircraft operator desires to land the aircraft 100 in a STOL free wing flight mode, the reverse procedure is used. The articulated boom is pivoted relative to the fuselage in the counter-clockwise direction A, i.e., toward the upper surface of the fuselage. In actuality, as the boom is "raised," it is essentially maintained in its horizontal or straight and level flight mode of FIG. 1 due to the dynamic pressure acting on its horizontal control surfaces 138 as a result of the straight and level direction of flight, and it is the fuselage 102 and the thrust line T of the propulsion system 104 which essentially rotates towards a vertical orientation with its nose pointed upwardly as best depicted in FIG. 2. As the fuselage 102 and the thrust line T rotate towards the vertical, horizontal speed is gradually decreased and the vertical thrust vector gradually increases. As a result, the lift generated by variable-pitch propulsion system 104 increases to compensate for the decreasing wing lift.

The effect of varying the pitch of the propulsion system 104 on the glide path of the aircraft is schematically illustrated in FIG. 3. As the aircraft begins the descent for landing, the propellers of variable pitch propulsion system are set in an intermediate pitch position, as shown in (a) of FIG. 3. Thus, there is provided by the variable pitch propulsion system 104 "room" for the pitch to change in either direction. When the pitch of the propeller blades is decreased relative to the plane of the propeller, as shown in (b) of FIG. 3, the lift is consequently reduced, resulting in a relatively steep glide path. Conversely, as shown in FIG. 3(c), increasing the pitch of the propeller blades results in greater lift, i.e., a relatively shallow glide path. Accordingly, if the aircraft is descending at too steep of an angle or too great of a speed, the pilot can increase the pitch of the propeller blades, whereupon the lift of the aircraft is increased with a resulting decrease in both speed and descent angle. Similarly, if the aircraft is descending too slowly or at too shallow of an angle, the pilot can decrease the pitch of the propeller blades and accordingly decrease the lift and increase the speed and angle of descent.

Advantageously, adjustment of the pitch of the propeller is virtually instantaneous, thereby invoking an instantaneous response in the engine. Hence, the utilization of a variable pitch propulsion system eliminates the aforementioned problems with spool-up delay. Furthermore, the delay in feedback is also eliminated, since a change in the pitch of the propeller results in a virtually simultaneous change in the lift of the aircraft.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. A method for adjusting the glide path control of a VTOL/STOL aircraft propelled by a variable pitch propulsion system during landing, comprising the steps of:

determining whether the speed of the aircraft on descent is too rapid or too slow; and adjusting the pitch of the propeller blades to adjust the speed of the aircraft, wherein the step of adjusting the pitch of the propeller blades comprises:
increasing the pitch of the propeller blades to decrease the speed of the aircraft; and
decreasing the pitch of propeller blades to increase the speed of the aircraft, wherein said aircraft includes a freewing connected to a fuselage for free pivotal movement relative thereto about a spanwise axis and wherein said fuselage, during landing approach, is in a generally vertical orientation, lift thereby being primarily developed by the thrust of the variable pitch propulsion system.

2. A method for adjusting the glide path control of a VTOL/STOL aircraft propelled by a variable pitch propulsion system during landing, comprising the steps of:

determining whether the angle descent of the aircraft is too steep or too shallow; and
adjusting the pitch of the propeller blades to adjust the angle of descent of the aircraft, wherein the step of adjusting the pitch of the propeller blades comprises:
increasing the pitch of the propeller blades to decrease the angle of descent of the aircraft; and
decreasing the pitch of propeller blades to increase the angle of descent of the aircraft, wherein said aircraft includes a freewing connected to a fuselage for free pivotal movement relative thereto about a spanwise axis and wherein said fuselage, during landing approach, is in a generally vertical orientation, lift thereby being primarily developed by the thrust of the variable pitch propulsion system.

* * * * *